United States Patent [19]

Matsumoto

[11] Patent Number: 5,467,337
[45] Date of Patent: Nov. 14, 1995

[54] OPTICAL DISK REPRODUCING METHOD AND APPARATUS

[75] Inventor: Hiroyuki Matsumoto, Tokyo, Japan

[73] Assignee: Nikon Corporation, Tokyo, Japan

[21] Appl. No.: 204,609

[22] Filed: Mar. 2, 1994

[30] Foreign Application Priority Data

Mar. 4, 1993 [JP] Japan ..................... 5-043476

[51] Int. Cl.$^6$ ................................. G11B 7/125
[52] U.S. Cl. .................. 369/116; 369/100; 369/106
[58] Field of Search ..................... 369/116, 100, 369/106, 284, 119, 107

[56] References Cited

U.S. PATENT DOCUMENTS

| | | | |
|---|---|---|---|
| 4,157,568 | 6/1979 | Ohki et al. ........................... | 369/116 |
| 5,018,119 | 5/1991 | Aratani et al. ....................... | 369/13 |
| 5,276,670 | 1/1994 | Nogami et al. ....................... | 369/100 |
| 5,313,448 | 5/1994 | Sukeda et al. ........................ | 369/116 |

FOREIGN PATENT DOCUMENTS

| | | |
|---|---|---|
| 0524315 | 1/1993 | European Pat. Off. . |
| 2753195 | 6/1978 | Germany . |
| 1551022 | 8/1979 | United Kingdom . |

OTHER PUBLICATIONS

Ohta, M. et al, "Read Out Mechanism of Magnetically Induced Super Resolution", *Proceedings of Magneto-Optical Recording International Symposium '91*, vol. 15, (1991), pp. 319-322.
Patent Abstracts of Japan, vol. 6, No. 59 (P-110) (937), 16 Apr. 1982 (JP-A-56 169 233).
Patent Abstracts of Japan, vol. 10, No. 124 (P-454), (2181), 9 May 1986 (JP-A-60 251 524).
Patent Abstracts of Japan, vol. 8, No. 18 (P-250), (1455), 26 Jan. 1984 (JP-A-58 177 534).

*Primary Examiner*—David C. Nelms
*Assistant Examiner*—Tan Nguyen
*Attorney, Agent, or Firm*—Shapiro and Shapiro

[57] ABSTRACT

In an optical disk reproducing apparatus including an optical disk, an optical disk rotating device, a light source for radiating a reproduction beam on the optical disk, a light condensing device for condensing the reproduction beam on the optical disk, a detection device for detecting a beam passing through or reflected by the optical disk, and a position detection device for detecting a reproduction beam condensing position, or in a method using this apparatus, the intensity of the reproduction beam is changed in accordance with the reproduction beam condensing position on the optical disk to perform reproduction.

1 Claim, 6 Drawing Sheets

OPTICAL DISK REPRODUCING METHOD AND APPARATUS

BACKGROUND OF THE INVENTION

1. Field of the Invention

The present invention relates to an optical disk reproducing method and apparatus.

2. Related Background Art

Recently, an effort has been made to develop an optical recording/reproducing method which meets various demands such as a high density, a large capacity, a high access speed, or a high recording/reproducing speed, and a recording/reproducing apparatus and a recording medium (disk) used for this method.

Information is recorded by, e.g., utilizing three-dimensional patterns formed on a substrate or reflectance difference caused due to a phase change between crystal and amorphous phases, or by forming a recording layer consisting of a magnetic film on a substrate to record information by difference in direction of magnetization, thereby forming a recording mark.

A laser beam is generally used to reproduce the recording marks. The laser beam is formed to be a spot as small as the diffraction limit defined by the wavelength of the laser beam to read the phase shape of the disk, the reflectance difference, rotation of the polarized light caused due to the magnetooptical effect of the magnetic film or the like. Because of the noise of the apparatus, a better S/N ratio can be obtained by increasing the reproduction light amount. On the other hand, in a rewritable optical disk, information is recorded by heat using optical energy. Therefore, when the information on the medium is to be reproduced, the power must be controlled not to destroy the information by the reproduction beam.

In recent years, an information recording method which changes the recording frequency in accordance with the radial position on the disk to realize higher-density recording has been proposed. However, when the recording frequency is changed in accordance with the radial position on the disk, the recording frequency at the outer peripheral portion is increased to broaden the reproduction frequency band at the outer peripheral portion. For this reason, the S/N ratio at the outer peripheral portion is degraded as compared to that at the inner portion.

In another information reproducing method, a multilayered structure of magnetic layers is formed to utilize magnetic super resolution due to heat of the reproduction beam, thereby reading high-density-recorded marks (MORIS' 91, 18-I-06). However, in the above method, the medium temperature at the reproduction position must be within a predetermined range. Even in one disk, the temperature is increased by the reproduction beam in a different way depending on the rotational speed or linear velocity. Therefore, the above method can be hardly realized.

An object of the present invention is to solve the above problems posed in the conventional optical disk reproducing apparatus.

As a result of extensive studies of the present inventor, a novel optical disk reproducing method and apparatus have been invented.

According to the first aspect of the present invention, there is provided an optical disk reproducing method using an optical disk reproducing apparatus comprising an optical disk, optical disk rotating means, a light source for irradiating a reproduction beam on the optical disk, light condensing means for condensing the reproduction beam on the optical disk, detection means for detecting a beam passing through or reflected by the optical disk, and position detection means for detecting a reproduction beam condensing position in a radial direction on the optical disk, wherein an intensity of the reproduction beam is changed in accordance with the reproduction beam condensing position on the optical disk.

According to the second aspect of the present invention, there is provided an optical disk reproducing method using an optical disk reproducing apparatus comprising an optical disk, optical disk rotating means, a light source for irradiating a reproduction beam on the optical disk, light condensing means for condensing the reproduction beam on the optical disk, detection means for detecting a beam passing through or reflected by the optical disk, and position detection means for detecting a reproduction beam condensing position in a radial direction on the optical disk, wherein an intensity of the reproduction. beam in reproduction of an outer region of the disk is set to be larger than that in reproduction of an inner region of the optical disk.

According to the third aspect of the present invention, there is provided an optical disk reproducing method using an optical disk reproducing apparatus comprising an optical disk, optical disk rotating means, a light source for irradiating a reproduction beam on the optical disk, light condensing means for condensing the reproduction beam on the optical disk, detection means for detecting a beam passing through or reflected by the optical disk, and position detection means for detecting a reproduction beam condensing position in a radial direction on the optical disk, wherein an intensity of the reproduction beam is changed in accordance with a linear velocity of the optical disk at the reproduction beam condensing position.

According to the fourth aspect of the present invention, there is provided an optical disk reproducing apparatus comprising an optical disk, optical disk rotating means, a light source for irradiating a reproduction beam on the optical disk, light condensing means for condensing the reproduction beam on the optical disk, detection means for detecting a beam passing through or reflected by the optical disk, position detection means for detecting a reproduction beam condensing position in a radial direction on the optical disk, and reproduction beam drive means for changing an intensity of the reproduction beam in accordance with the reproduction beam condensing position.

According to the fifth aspect of the present invention, there is provided an optical disk reproducing apparatus comprising an optical disk, optical disk rotating means, a light source for irradiating a reproduction beam on the optical disk, light condensing means for condensing the reproduction beam on the optical disk, detection means for detecting a beam passing through or reflected by the optical disk, position detection means for detecting a reproduction beam condensing position in a radial direction on the optical disk, and reproduction beam drive means for changing an intensity of the reproduction beam in accordance with a linear velocity of the optical disk at the reproduction beam condensing position.

According to the sixth aspect of the present invention, there is provided an optical disk reproducing method using an optical disk reproducing apparatus comprising an optical disk, optical disk rotating means, a light source for irradiating a reproduction beam on the optical disk, light condensing means for condensing the reproduction beam on the optical disk, detection means for detecting a beam passing through or reflected by the optical disk, and position detection means for detecting a reproduction beam condensing position in a radial direction on the optical disk, wherein an intensity of the reproduction beam is changed in accordance with a linear velocity of the optical disk at the reproduction beam condensing position so that a substantially constant medium temperature is obtained at a reproduction beam irradiation portion of the optical disk.

According to the seventh aspect of the present invention, there is provided an optical disk reproducing apparatus comprising an optical disk, optical disk rotating means, a light source for irradiating a reproduction beam on the optical disk, light condensing means for condensing the reproduction beam on the optical disk, detection means for detecting a beam passing through or reflected by the optical disk, position detection means for detecting a reproduction beam condensing position in a radial direction on the optical disk, and reproduction beam drive means for changing an intensity of the reproduction beam in accordance with a linear velocity of the optical disk at the reproduction beam condensing position so that a substantially constant medium temperature is obtained at a reproduction beam irradiation portion of the optical disk.

In the above methods and apparatuses, the intensity of the reproduction beam may be changed stepwise from the inner side to the outer side of the optical disk, or it may be linearly, curvilinearly, or polygonally changed in accordance with the linear velocity on the basis of the information recorded on the disk.

The intensity of the reproduction beam may be changed by changing the light intensity of the reproduction light source itself, or inserting a filter between the reproduction light source and the optical disk.

Furthermore, since the reproducing apparatus can also be used as a recording apparatus by changing the intensity of the reproduction beam, it may also serve as a recording apparatus.

Although the present invention will be described in detail below with reference to its preferred embodiments, the present invention is not limited to these specific embodiments.

DETAILED DESCRIPTION OF THE PREFERRED EMBODIMENTS

[First Embodiment . . . Reproducing Apparatus]

Figure 1:
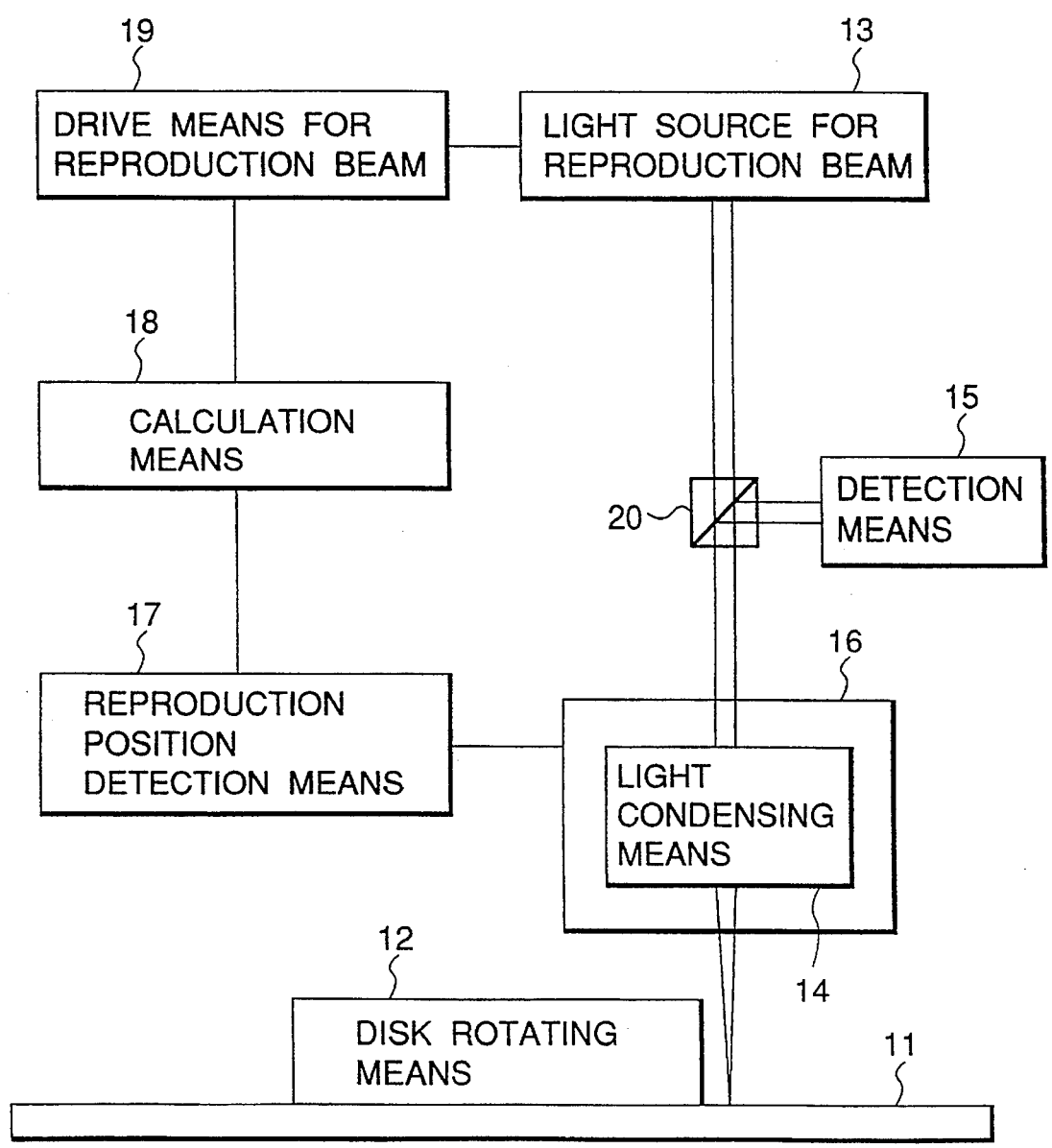
FIG. 1 is a schematic view showing the arrangement of a reproducing apparatus according to the first embodiment of the present invention.

FIG. 1 is a schematic view showing an optical disk reproducing apparatus according to an embodiment of the present invention. A light beam is emitted from a reproduction beam light source 13 constituted by a 780 nm semiconductor laser. The light beam is condensed, through a polarization beam splitter 20, onto an optical disk 11 by a light condensing means 14 for condensing a reproduction beam. The light condensing means 14 is arranged on a reproduction position moving means 16 for changing the beam condensing position in the radial direction. Specifically, the light condensing means 14 is constituted by an objective lens having a numerical aperture (NA) of 0.55. The reproduction position moving means 16 is constituted by an actuator for driving the objective lens to perform focusing and tracking and a slider for moving the actuator in the radial direction to change the beam condensing position on the disk. The disk 11 is rotated by a DD motor 12. The light beam reflected by the disk 11 is incident on a light detection means 15 through the polarization beam splitter 20. The light detection means 15 is constituted by an analyzer, a detector and the like, for reading the reflected beam, and detects the modulated signal. In this apparatus, a reproduction position detection means 17, having a linear scale for reading the radial position of the slider, detects the radial position on the disk which is irradiated with the reproduction beam. Information representing the irradiation position of the beam is output to a calculation means 18. The calculation means 18 controls a laser drive circuit 19 for driving the semiconductor laser 13 on the basis of the input information to change the intensity of the reproduction beam.

Figure 2:
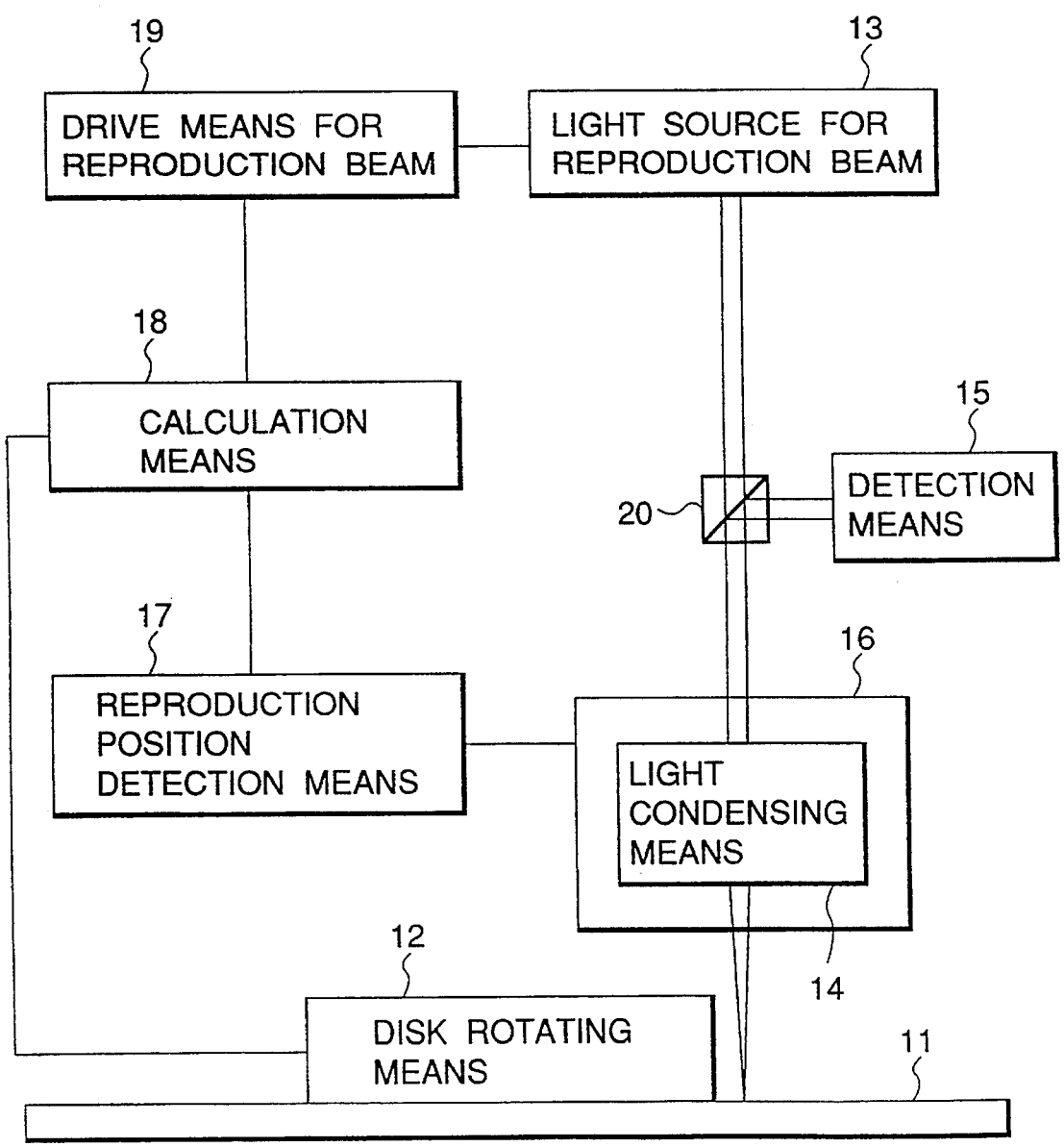
FIG. 2 is a view showing a modification of the apparatus of the first embodiment.

FIG. 2 is a schematic view showing a modification of the optical disk reproducing apparatus of the above embodiment. Although the modified apparatus has almost the same arrangement as in the above embodiment, in this case, information representing the rotational speed of the disk is input to the calculation means 18 from the motor 12. The calculation means 18 calculates the linear velocity of the optical disk at the radiation position of the beam on the basis of the information representing the radiation position of the beam (i.e., reproduction position) input from the reproduction position detection means and the information representing the rotational speed of the disk input from the motor 12. The calculation means 18 controls the laser drive circuit on the basis of the obtained linear velocity of the optical disk to change the intensity of the reproduction beam.

In the above apparatuses, the light condensing position on the disk is detected by the reproduction position detection means 17. However, the beam condensing position may be read out by using the detection means 15 on the basis of the information recorded on the optical disk, and the intensity of the reproduction beam may be changed by using this information.

[Second Embodiment . . . First Reproduction Experiment]

Figure 3:
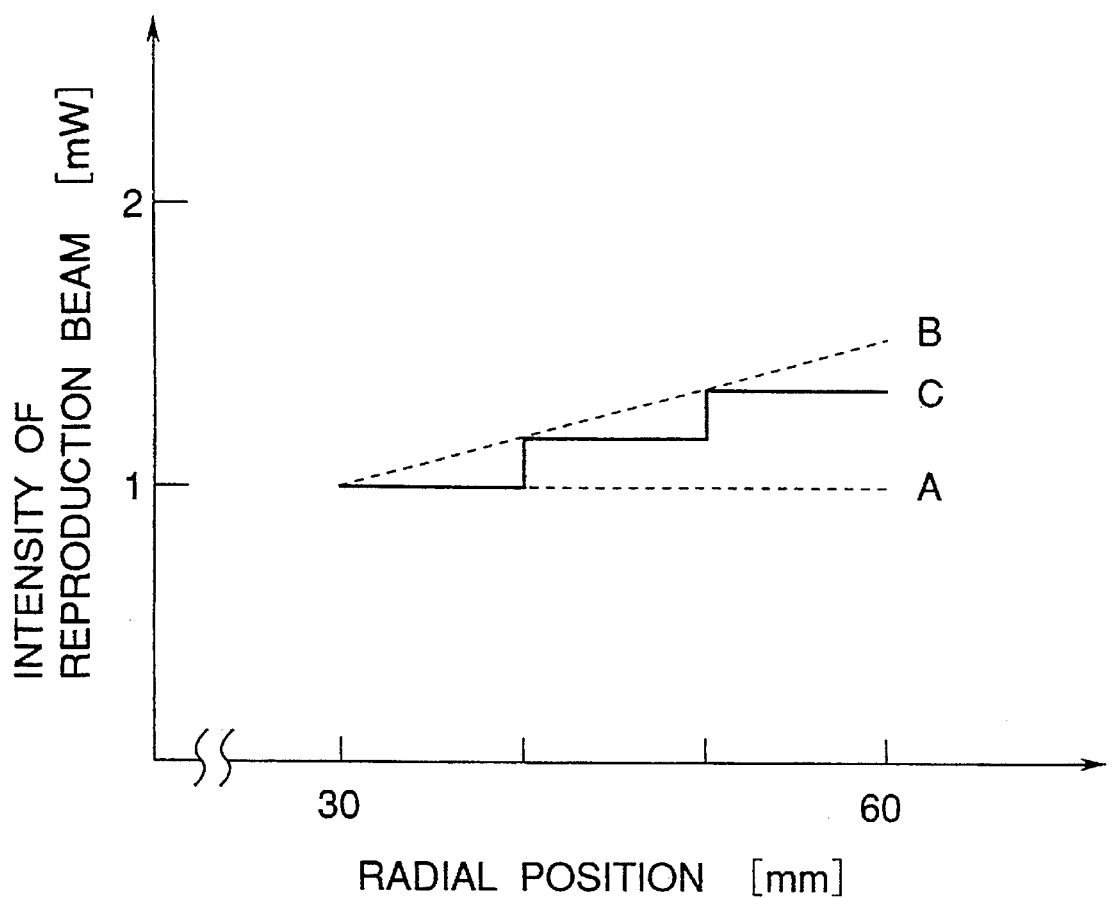
FIG. 3 is a graph showing the intensity of a reproduction beam as a function of the radial position in a reproduction experiment according to the second embodiment of the present invention.
Figure 4:
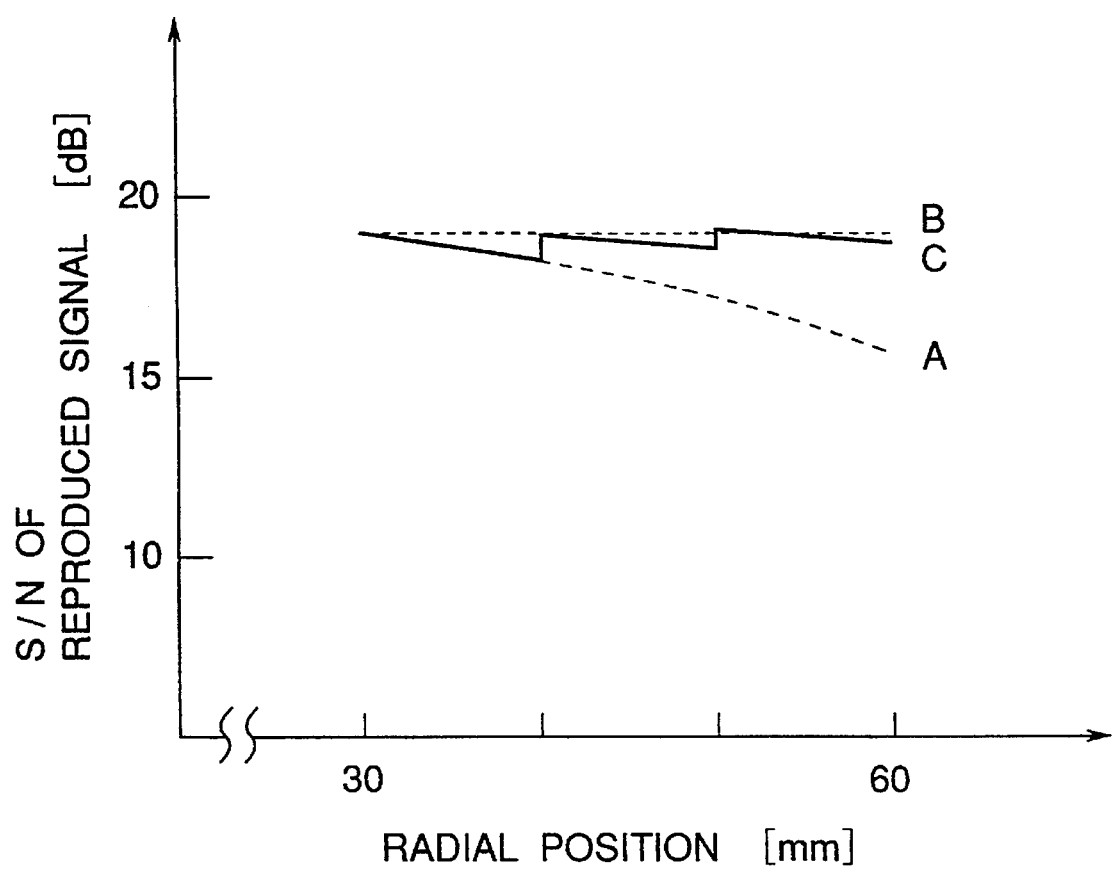
FIG. 4 is a graph showing the S/N ratio as a function of the radial position in the reproduction experiment according to the second embodiment of the present invention.

A magnetooptical disk was prepared, in which information had been recorded in advance by using another optical disk recording apparatus, and the recording frequency at the outer radial position was set to be twice that at the inner radial position. The above optical disk was set in the reproducing apparatus of the first embodiment to perform a magnetooptical reproduction experiment. The experiment was performed by variously changing the intensity of the reproduction beam (A, B, and C in FIG. 3) in accordance with the position of the slider, as shown in FIG. 3. The S/N ratios at the respective radial positions are shown in FIG. 4. A represents the S/N ratio in the conventional irradiating method in which the intensity of the reproduction beam is not changed regardless of the irradiation position of the reproduction beam on the optical disk. B represents the S/N ratio in the irradiating method of the present invention in which the intensity of the reproduction beam is continuously increased as the irradiation position of the reproduction beam is moved from an inner radial position to an outer radial position of the optical disk. C represents the S/N ratio in the radiating method of the present invention in which the intensity of the reproduction beam is increased stepwise.

Referring to FIG. 4 showing the changes in the S/N ratios of the reproduction signals at the respective radial positions, the S/N ratio of the reproduction signal represented by A of the conventional irradiating method is degraded from an inner radial position to an outer radial position of the optical disk. To the contrary, in the cases of B and C of the irradiating methods of the present invention, the S/N ratios exhibit a predetermined value from an inner radial position to an outer radial position without being degraded.

[Third Embodiment . . . Second Reproduction Experiment]

A magnetooptical disk using magnetic super resolution (MSR) was prepared. Information had been recorded in advance in all recording tracks of this disk by using another optical disk recording apparatus. In the MSR, a recording mark smaller than the diameter of the irradiation spot of a reproduction beam is recorded. By utilizing the fact that the temperature in a trailing region of the irradiation spot on the rotating optical disk is higher than that of the other portions by a heat accumulation effect, the recording mark is read and reproduced using this region of the spot. Conventionally, a recording mark smaller than the beam spot of the reproduction beam cannot be read. In an optical disk using the MSR, however, a recording mark smaller than the beam spot can be read to allow high-density recording.

Figure 5:
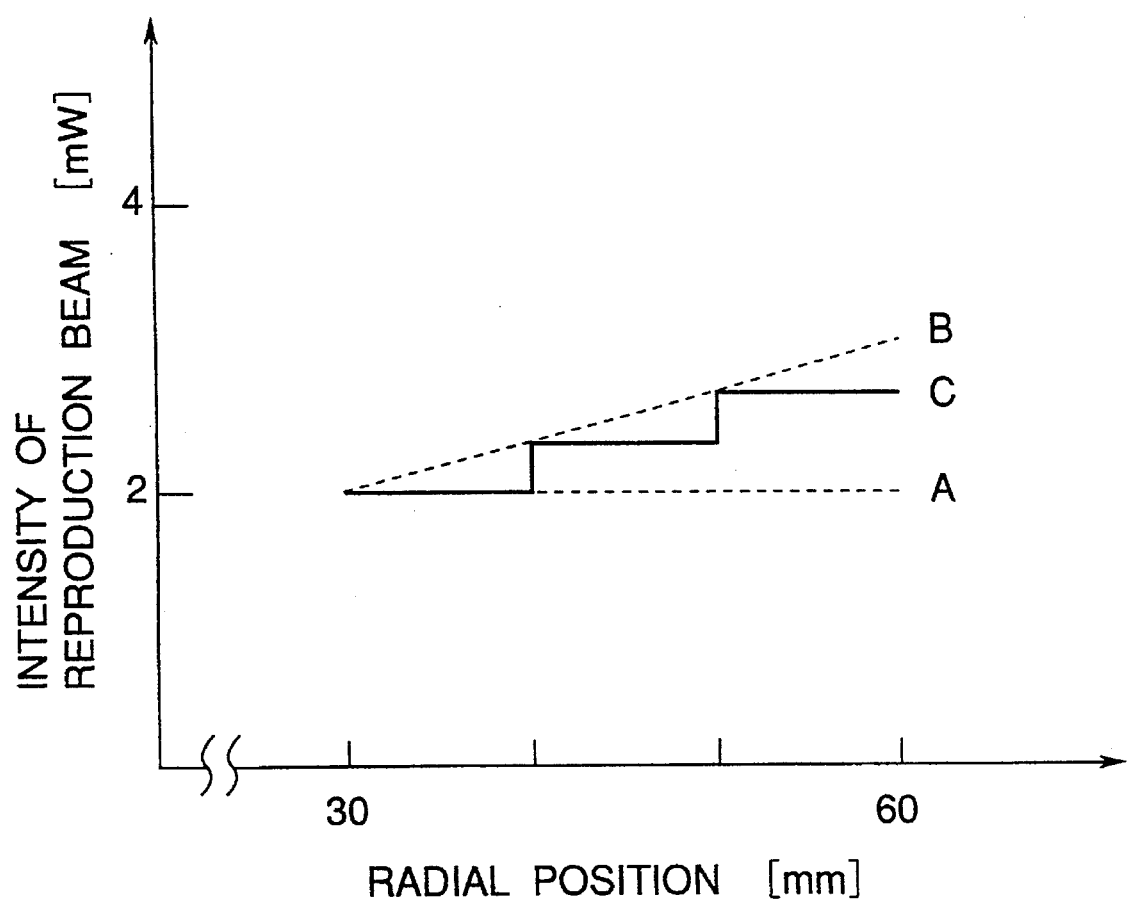
FIG. 5 is a graph showing the intensity of the reproduction beam as a function of the radial position in a reproduction experiment according to the third embodiment of the present invention.
Figure 6:
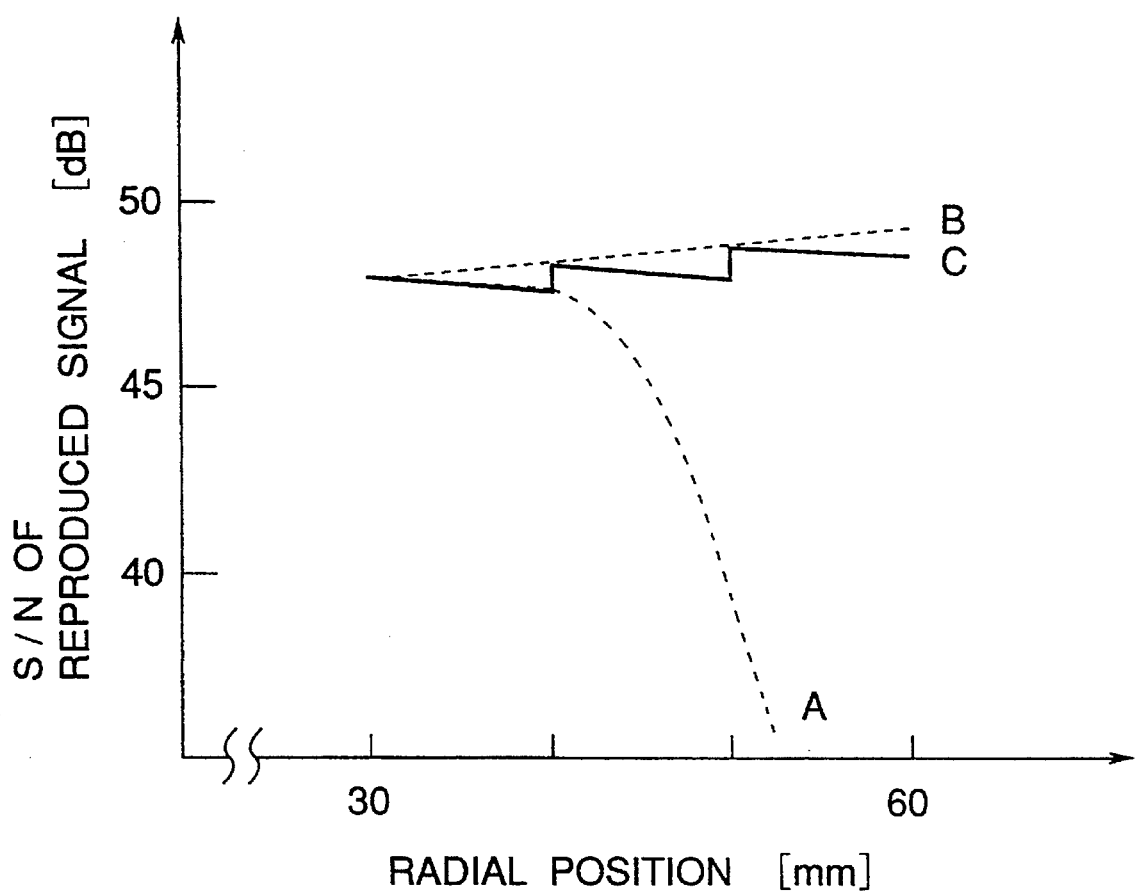
FIG. 6 is a graph showing the C/N ratio as a function of the radial position in the reproduction experiment according to the third embodiment of the present invention.

The above magnetooptical disk was set in the reproducing apparatus of the first embodiment to perform a reproduction experiment. The experiment was performed by variously changing the intensity of the reproduction beam in accordance with the position of the slider, as shown in FIG. 5. The C/N ratios at the respective radial positions are shown in FIG. 6. As in the second embodiment, A represents the C/N ratio in the conventional radiating method, and B and C represent the C/N ratios in the radiating methods of the present invention.

Each reproduction beam radiating method shown in FIG. 5 is the same as in FIG. 3 of the second embodiment.

Referring to FIG. 6 showing the changes in the C/N ratios of the reproduction signals at the respective radial positions, the C/N ratio represented by A of the conventional radiating method is greatly degraded from an inner diameter position to an outer diameter position of the optical disk. To the contrary, in the cases of B and C of the radiating methods of the present invention, the C/N ratios have a tendency to increase rather than to degrade from an inner diameter position to an outer diameter position of the optical disk.

As described above, according to the present invention, a high S/N ratio can be obtained even in a wider frequency band at the outer peripheral portion. In an optical disk using MSR which allows high-density recording, a constant medium temperature of the optical disk can be obtained regardless of various linear velocities, even in a CAV (constant angular velocity) format which conventionally had a demerit of a small memory capacity per track (the memory capacity per track is defined by the number of recordable marks in the innermost peripheral region in the recording region of an optical disk). Therefore, a small mark can be read out regardless of the radial position of the reproduction beam on the optical disk while reducing the jitter.

What is claimed is:

1. An optical disk reproducing method using an optical disk reproducing apparatus comprising an optical disk, optical disk rotating means, a light source for irradiating a reproduction beam on the optical disk, light condensing means for condensing the reproduction beam on the optical disk, detection means for detecting a beam passing through or reflected by the optical disk, and position detection means for detecting a reproduction beam condensing position in a radial direction on the optical disk, wherein an intensity of the reproduction beam in reproduction of an outer region of the disk is set to be larger than that in reproduction of an inner region of the optical disk.

* * * * *